(12) United States Patent
Pan et al.

(10) Patent No.: US 6,775,883 B2
(45) Date of Patent: Aug. 17, 2004

(54) HINGE MECHANISM (75) Inventors: Long-Jyh Pan, Shijr (TW); Hsiao-Wu Chen, Pingjen (TW)

(73) Assignee: BenQ Corporation, Taoyuan Shien (TW)

( * ) Notice: Subject to any disclaimer, the term of this patent is extended or adjusted under 35 U.S.C. 154(b) by 0 days.

(21) Appl. No.: 10/366,699

(22) Filed: Feb. 14, 2003

(65) Prior Publication Data

US 2003/0163899 A1 Sep. 4, 2003

(30) Foreign Application Priority Data

Mar. 1, 2002 (TW) ........................... 91103878 A (51) Int. Cl.[7] ................................................ E05F 1/14
(52) U.S. Cl. ............................ 16/284; 16/285; 16/300; 16/319; 16/321
(58) Field of Search ........................... 16/284, 285, 297, 16/300, 319, 321, 324–328, 374; 455/575.3

(56) References Cited

U.S. PATENT DOCUMENTS 4,788,746 A * 12/1988 Idler ............................ 16/297
5,586,363 A * 12/1996 Fanuzzi ....................... 16/342
5,996,179 A * 12/1999 Huong ......................... 16/330
6,148,480 A * 11/2000 Cooke ......................... 16/303
6,256,481 B1   7/2001 Jeong et al. ................. 455/90
6,459,887 B2 * 10/2002 Okuda ...................... 455/90.1
6,678,539 B1 *  1/2004 Lu ........................... 455/575.1

* cited by examiner

Primary Examiner—John B. Walsh
(74) Attorney, Agent, or Firm—Rabin & Berdo, P.C.

(57) ABSTRACT

A hinge mechanism for pivotally connecting a flip onto a housing includes a bush, a compression spring, and a release button. The bush has a sidewall, a receiving space defined by the sidewall, and a protrusion. The protrusion is protruded from the sidewall. The release button has a shaped notch, which includes a concave portion, a stop portion, and a convex portion formed between the concave portion and the stop portion. The stop portion extends substantially parallel to the pivoting axis. The protrusion is slidably received within the shaped notch. The compression spring is disposed within the receiving space and pressed by the release button and the bush. When closing the flip, the bush rotates synchronously with the flip and the protrusion moves in the shaped notch. When pushing the release button, the flip opens automatically.

20 Claims, 7 Drawing Sheets

HINGE MECHANISM

This application claims the benefit of Taiwan application Serial No. 091103878, filed Mar. 1, 2002.

BACKGROUND OF THE INVENTION

1. Field of the Invention

The invention relates in general to a hinge mechanism, and more particularly to a hinge mechanism with a release button by using spring elasticity.

2. Description of the Related Art

Cellular phones have come into general use with the close communication and the frequent need to exchange data and thus have become indispensable tools for modern people due to the features of compactness, portability, and convenience.

Figure 1:
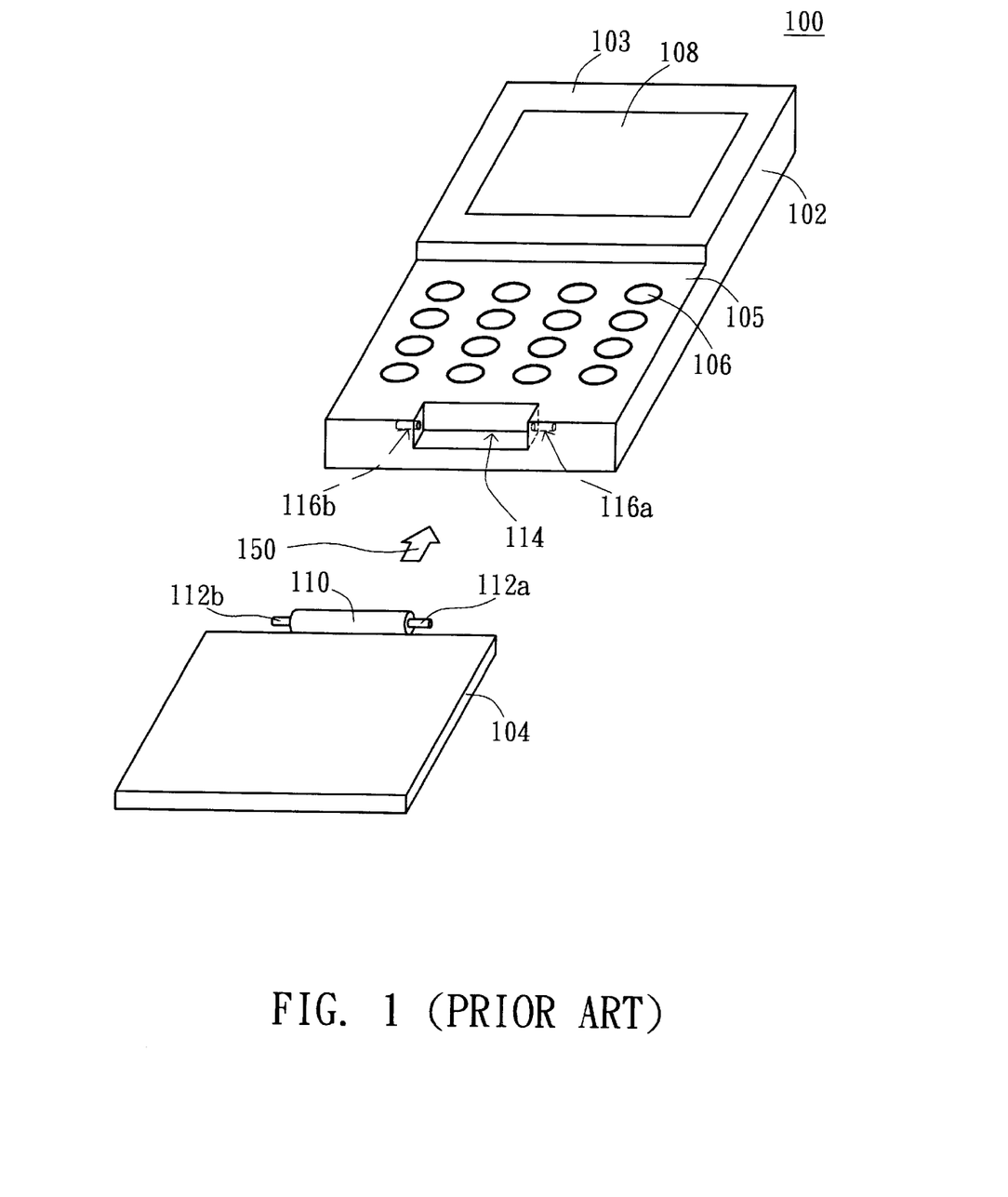
FIG. 1 (Prior Art) is an exploded view of a flip phone.

Referring to FIG. 1, an exploded view of a flip phone is shown. The flip phone 100 includes a housing 102 and a flip 104. The housing 102 includes a display section 103, an operation section 105, buttons 106, and a liquid crystal display (LCD) 108. The display section 103 is situated higher than the operation section 105. The buttons 106 are disposed on the operation section 105 and are used as the method of input. LCD 108 is positioned on the display section 103 and is used for display.

The flip 104 has a sleeve 110 connected with one end of the flip 104. The shafts 112a and 112b are disposed at two ends of the sleeve 110 respectively. The housing 102 has a sunken part 114, which includes two holes 116a and 116b for receiving two shafts 112a and 112b respectively at opposite sides of the sunken part 114. When assembling the flip 104 to the housing 102, the sleeve 110 is installed in the sunken part 114 along the direction of the arrow sign 150 in FIG. 1, and then the shafts 112a and 112b are installed in the respective holes 116a and 116b for the rotation of the flip 104.

In general, the sleeve 110, the shafts 112a and 112b, the sunken part 114, and the holes 116a and 116b are called a hinge mechanism, which pivots the flip 104 on the housing 102. Since the housing 102, the sunken part 114, and the holes 116a and 116b are formed as an unit and the flip 104, the sleeve 110, and the shafts 112a and 112b are formed as an unit as well, it requires a strenuous effort to assemble and disassemble the flip phone 100. The sleeve 110 and the sunken part 114 are easily damaged in the attempt to separate the flip 104 from the housing 102 due to the tight configuration of the hinge mechanism, while the flip phone 100 requires repairing. Additionally, all components of the hinge mechanism would have to be discarded along with the damaged flip 104 and housing 102, which is a costly waste.

SUMMARY OF THE INVENTION

It is therefore an object of the invention to provide a hinge mechanism applied to a foldable device for easy assembly and disassembly. The hinge mechanism pivots a flip on a housing and prevents the flip and the housing from being damaged during the assembly or disassembly of the foldable device. In addition, it makes the foldable device easy to operate and convenient to use for a one-handed operation.

The invention achieves the above-identified objects by providing a hinge mechanism, for pivotally connecting a flip onto a housing so that the flip is rotatable around a pivoting axis. The hinge mechanism includes a bush, a compression spring, and a release button. The bush has a sidewall, a protrusion, and a receiving space defined by the sidewall. The protrusion is protruded from the sidewall. The release button has a first end, a second end, and a shaped notch. The shaped notch has a concave portion, a stop portion, and a convex portion formed between the concave portion and the stop portion. The stop portion extends substantially parallel to the pivoting axis. The protrusion is slidably received within the shaped notch. The first end of the release button is slidably coupled to the bush, and the second end of the release button is restrictedly coupled to the housing, so that the release button is only slidable relative to the housing substantially along the pivoting axis. The compression spring is disposed within the receiving space and pressed by the release button and the bush. When the flip pivots from the opened position to the closed position, the bush simultaneously rotates around the pivoting axis so that the protrusion moves from the concave portion to the stop portion. Only when the release button is moved toward the bush till the protrusion moves out of the stop portion and reaches the convex portion, the flip is capable to pivot from the closed position to the opened position.

Other objects, features, and advantages of the invention will become apparent from the following detailed description of the preferred but non-limiting embodiments. The following description is made with reference to the accompanying drawings.

DETAILED DESCRIPTION OF THE INVENTION

The hinge mechanism according to the preferred embodiment of the invention is applied to a foldable device, pivotally connecting the flip onto the housing and including a bush, a compression spring, and a release button. The hinge mechanism is designed for easy assembly and disassembly. It prevents the flip and the housing from being damaged during the assembly or disassembly of the foldable device. In addition, it makes the foldable device easy to operate and convenient to use for a one-handed operation, especially when the user carries heavy stuff with one hand.

The foldable device to which the hinge mechanism is applied can be a cellular phone or Personal Digital Assistant (PDA) but not limited thereto. The practical application of this invention will become apparent from the following detailed description and accompanying drawings of a flip phone using the hinge mechanism.

Figure 2A:
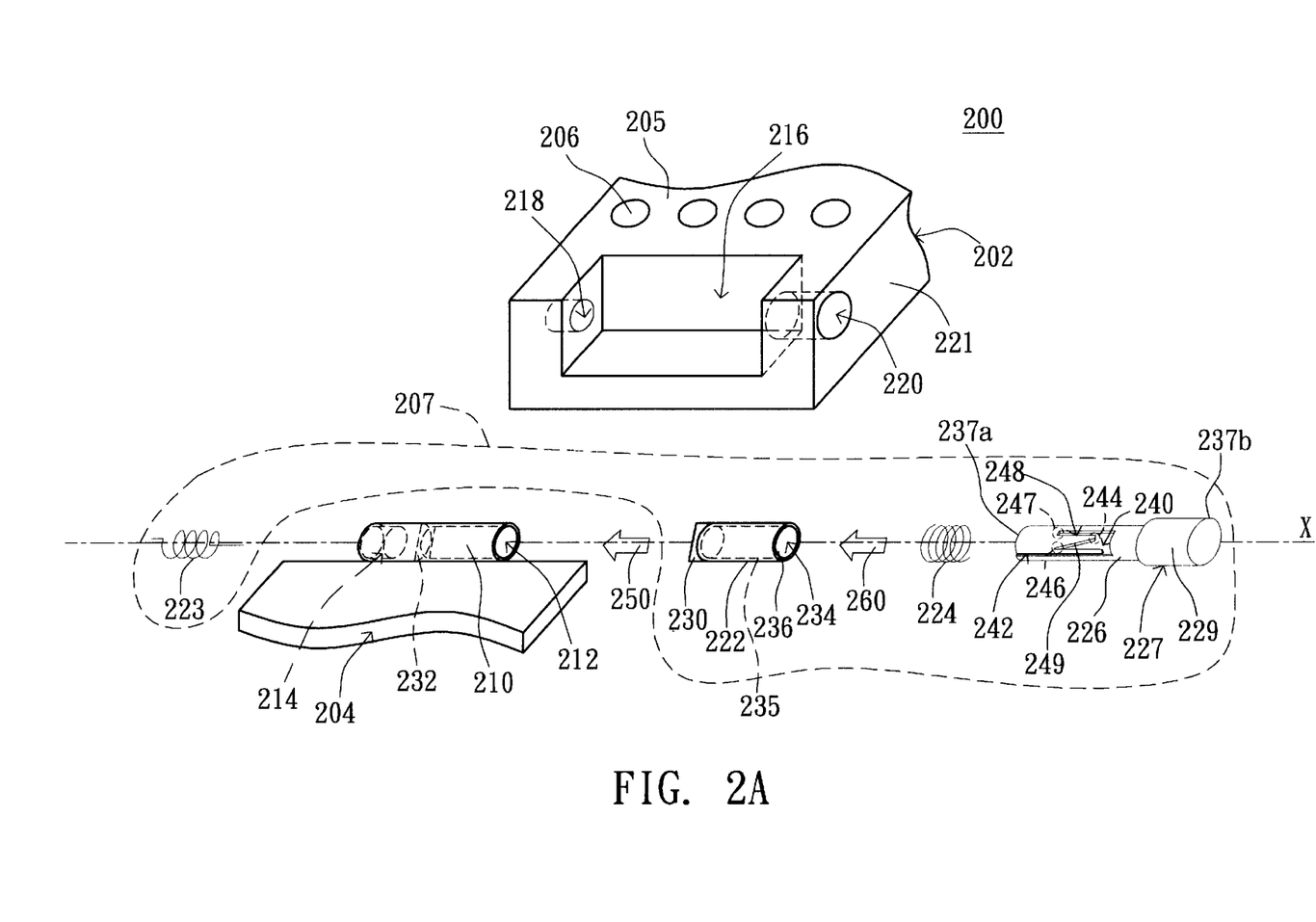
FIG. 2A shows an exploded view of a flip phone with a hinge mechanism according to the preferred embodiment of the invention.
Figure 2B:
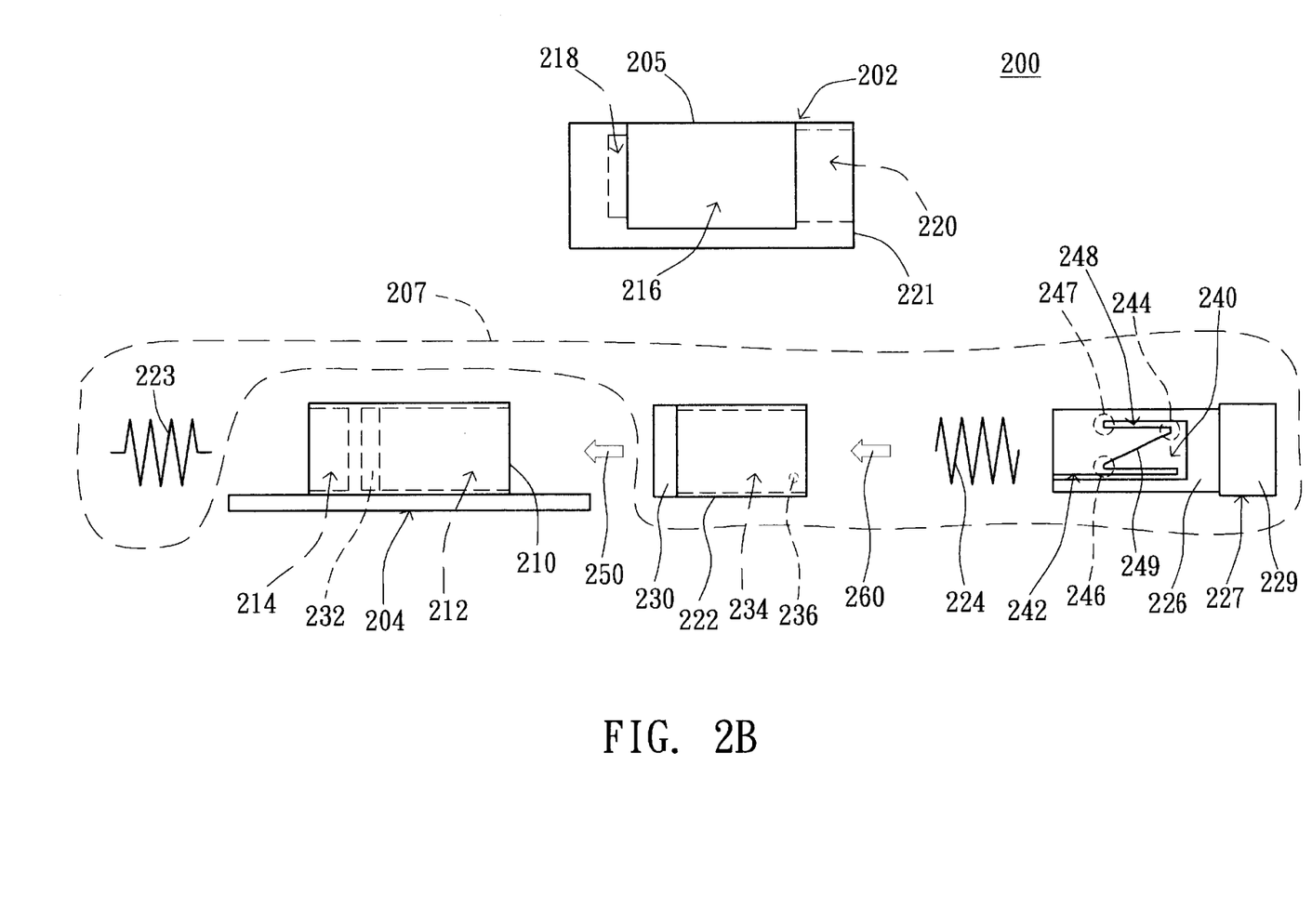
FIG. 2B is a lateral view of FIG. 2A.

Refer first to FIGS. 2A and 2B, which show an exploded view and a lateral view of a flip phone with a hinge mechanism according to the preferred embodiment of the invention. The flip phone 200 includes a housing 202, a flip 204, and a hinge mechanism 207. The hinge mechanism 207 pivotally connects the flip 204 onto the housing 202, so that the flip 204 is capable to rotate around a pivoting axis X. The housing 202 includes an operation section 205 and buttons 206. When the flip 204 is in the closed position, the flip 204 is situated on the operation section 205. The buttons 206 are disposed on the operation section 205 and are used for input.

The flip 204 includes a sleeve 210, one end of which has a bush-receiving space 212 for receiving the bush, and the other end of which includes a first joining hole 214. The housing 202 has a sunken part 216 for receiving the sleeve 210. The sunken part 216 includes a second joining hole 218 and a passage 220 at opposite sides of the sunken part 216. The release button 227 is able to pass through one side surface of the housing 202 via the passage 220.

The hinge mechanism 207 includes a bush 222, a torsion spring 223, a compression spring 224, and a release button 227. The torsion spring 223 disposed within the first joining hole 214 and the second joining hole 218 connects the sleeve 210 and the housing 202, so that the sleeve 210 is rotatably coupled with the housing 202. While the flip 204 is in the opened position, the torsion spring 223 stays in a natural condition. While the flip 204 is in the closed position, the torsion spring 223 twists and generates a returning force due to the rotation of the flip 204. The returning force is the reserved power for shifting the flip 204 from the closed position to the opened position.

The bush 222 can be installed in the bush-receiving space 212 along the direction of the arrow sign 250. A first cut 232 on the bottom of the sleeve 210 and a second cut 230 of the bush 222 are used for jointing the sleeve 210 and the bush 222 so that the bush 222 synchronously rotates with the flip 204. The bush 222 has a sidewall 235, a receiving space 234 defined by the sidewall, and a protrusion 236. The protrusion 236 is protruded from the sidewall 235. Besides, the compression spring 224 is disposed within the receiving space 234 along the direction of the arrow sign 260 and can be pressed by the release button 227 and the bush 222.

The release button 227 has a first end 237a, a second end 237b, a shaped notch 240, and an axial groove 242 connected to the shaped notch 240. The shaped notch 240 has a convex portion 244, a concave portion 246, a stop portion 247, an axial slot 248, and a slope 249. The convex portion 244 is formed between the concave portion 246 and the stop portion 247. The stop portion 247 extends substantially parallel to the pivoting axis X. The slope 249 is adjacent to the axial slot 248. The axial slot 248 connects the stop portion 247 and the convex portion 244 while the slope 249 connects the convex portion 244 and the concave portion 246. The protrusion 236 is slidably received within the shaped notch 240. The release button 227 further includes a camshaft 226 and a touch joint 229. The touch joint 229 is connected with the camshaft 226. When the cross-sections of the sleeve 210, bush 222, and camshaft 226 are round-shaped, the cross-sections of the touch joint 229 and the passage 220 are oval-shaped or in other non-radiate shape. Therefore, the second end 237b of the release button 227 is restrictedly coupled to the housing 202, so that the release button 227 is only slidable relative to the housing 202 substantially along the pivoting axis X. Besides, the cross-section of the touch joint 229 is larger than the cross-section of the camshaft 226 so as to prevent the release button 227 from rotating with the bush 222.

When the release button 227 passes through the passage 220, the camshaft 226 is therefore inserted into the receiving space 234 and the compression spring 224 connects the camshaft 226 and the bottom of the bush 234. The protrusion 236 moves from the axial groove 242 to the shaped notch 240 that the camshaft 226 can be movably installed in the receiving space 234 by the coupling between the protrusion 236 and the shaped notch 240. Furthermore, the touch joint 229 is movably installed in the passage 220 and able to axially pass through one side surface of the housing 202 for being touched by users. Consequently, the hinge mechanism 207 is able to pivotally connect the flip 204 onto the housing 202. When the flip 204 pivots from the opened position to the closed position, the bush 222 simultaneously rotates around the pivoting axis X so that the protrusion 236 moves from the concave portion 246 to the stop portion 247; only when the release button 226 is moved toward the bush 222 till the protrusion 226 moves out of the stop portion 247 and reaches the convex portion 244, the flip 204 is capable to pivot from the closed position to the opened position.

Figure 3A:
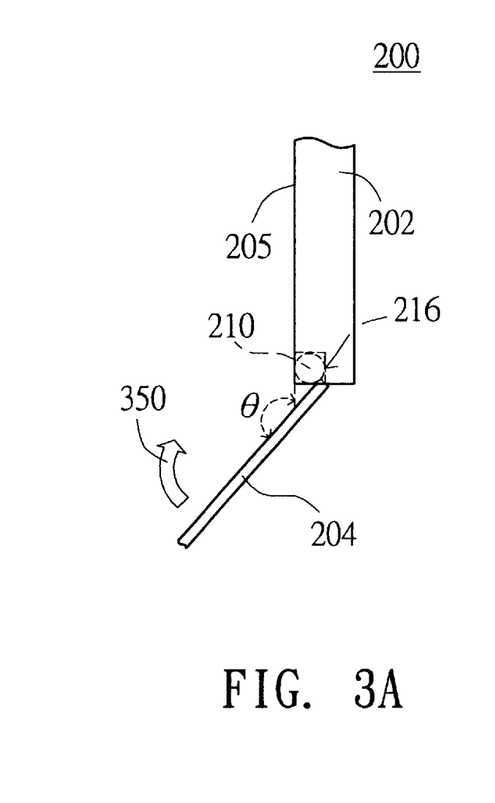
FIG. 3A shows a lateral view of a flip phone with the flip in the opened position.
Figure 3B:
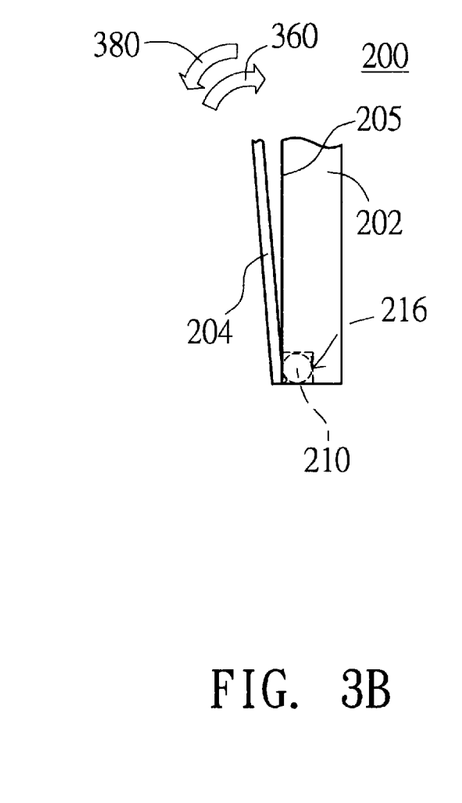
FIG. 3B shows a lateral view of a flip phone with the flip in the slightly opened position.
Figure 3C:
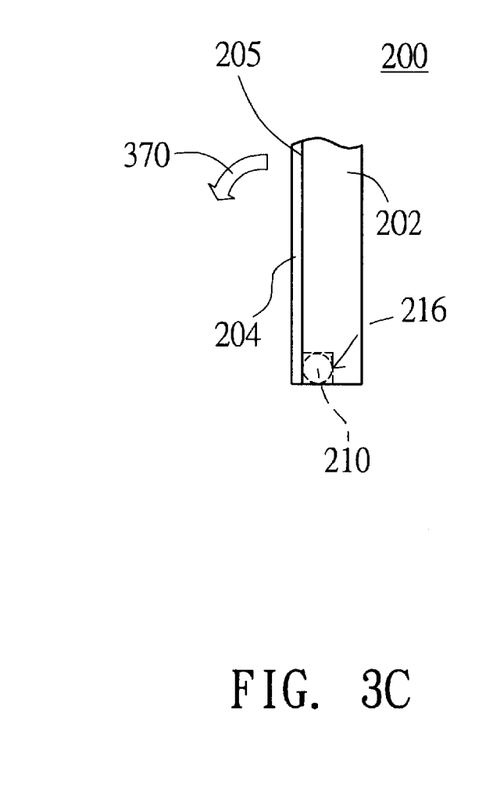
FIG. 3C shows a lateral view of a flip phone with the flip in the closed position.
Figure 4A:
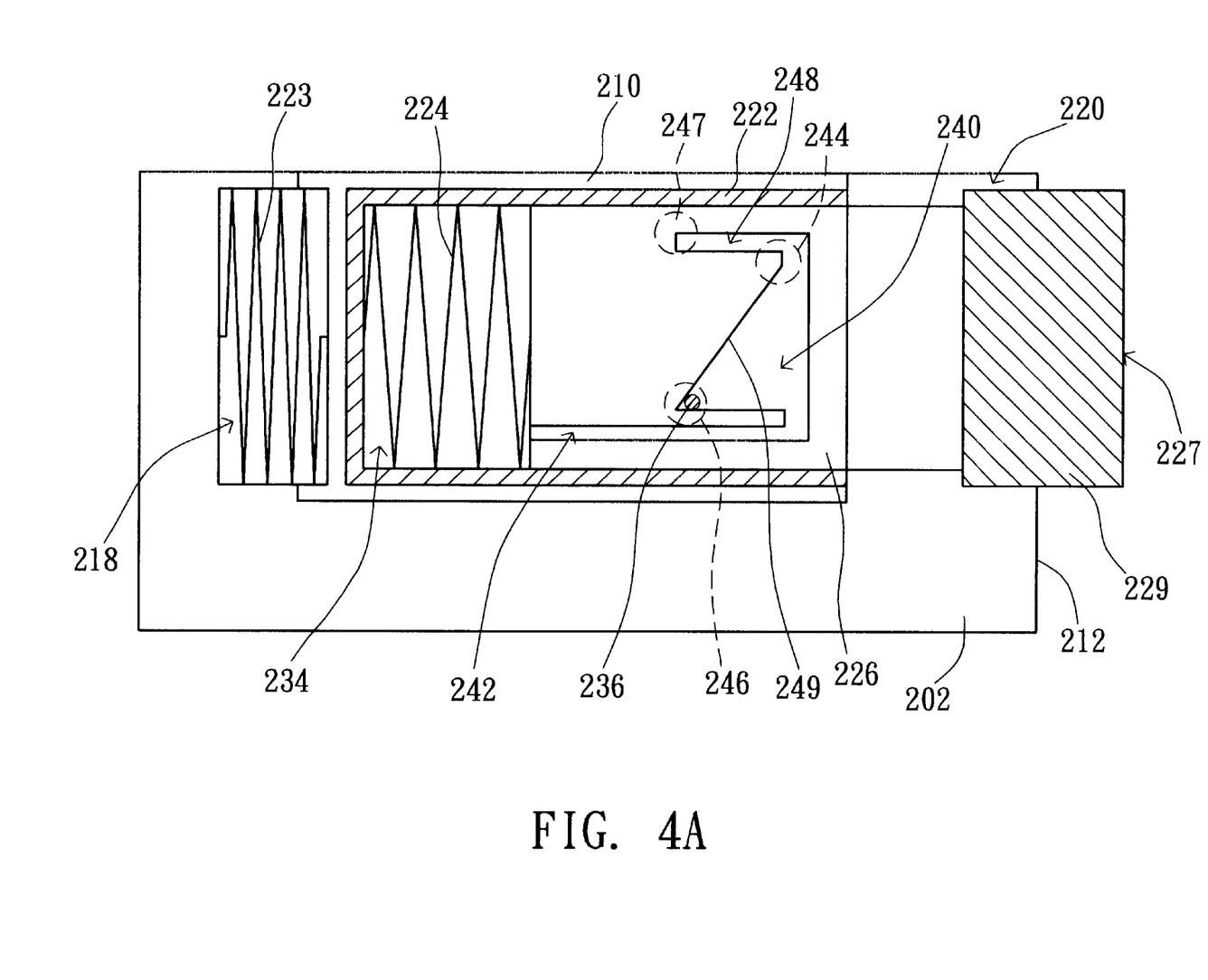
FIG. 4A is the hinge mechanism of FIG. 3A.
Figure 4B:
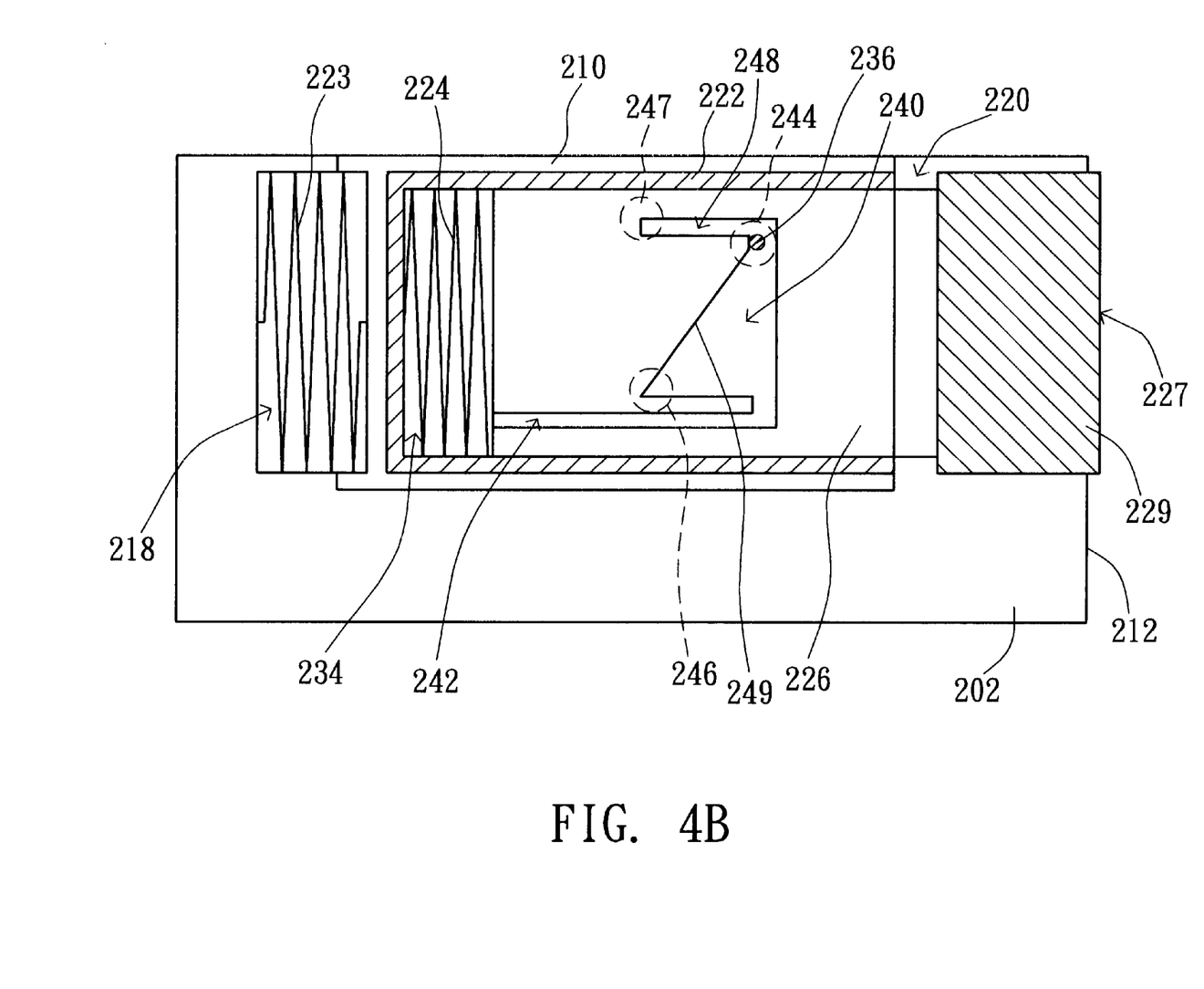
FIG. 4B is the hinge mechanism of FIG. 3B.
Figure 4C:
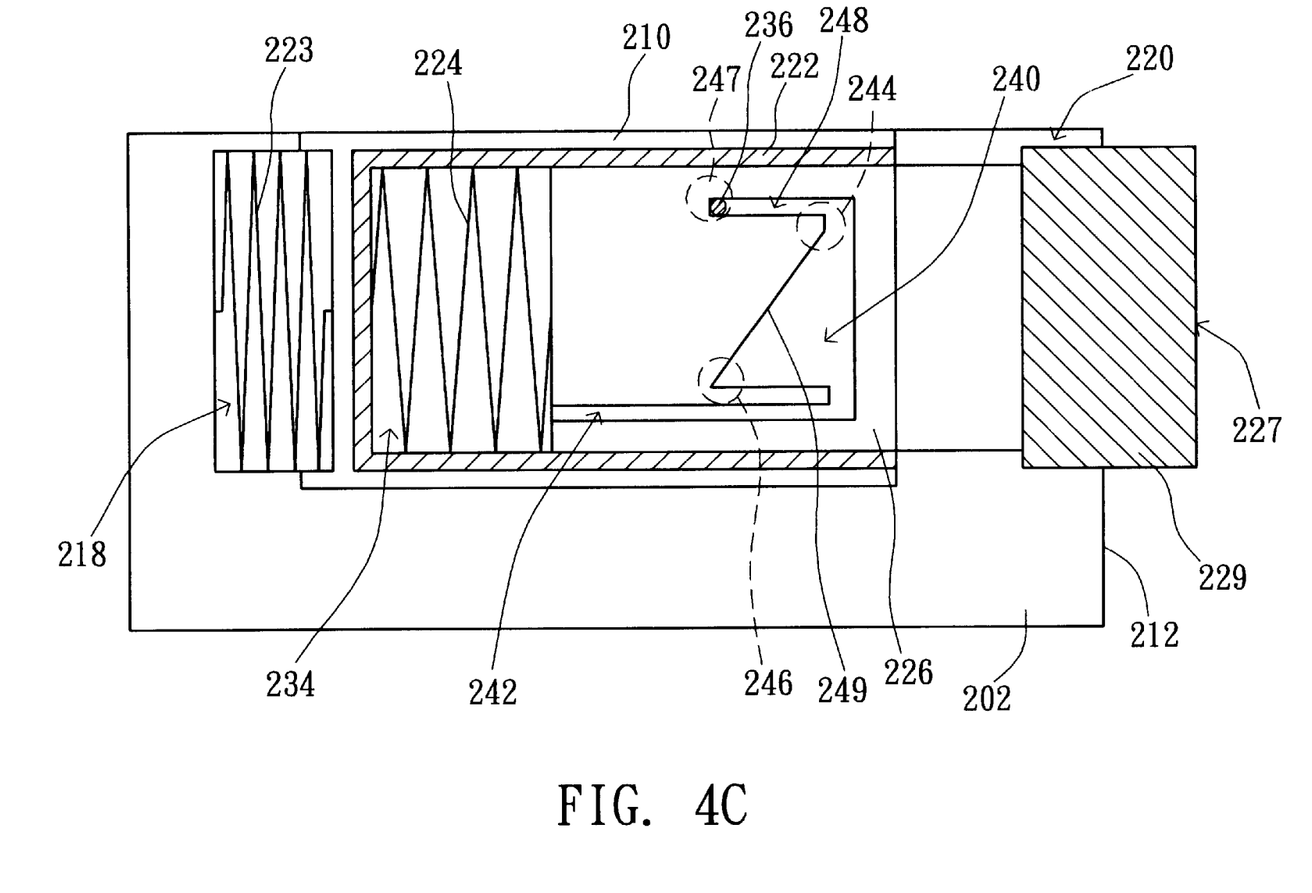
FIG. 4C is the hinge mechanism of FIG. 3C.

Please refer to FIGS. 3A–3C and FIGS. 4A–4C for further description about the interaction among all the components while the flip is operated to be in different positions. FIGS. 3A–3C are lateral views of a flip phone with the flip in the opened, slightly opened, and close positions. FIGS. 4A–4C show hinge mechanisms of FIGS. 3A–3C.

Referring to FIG. 4A, the protrusion 236 is located at the concave portion 246, and the camshaft 226 of the release button 227 is installed in the receiving space 234 and the passage 220. The touch joint 229 of the release button 227 is installed in the passage 220 and passes through one side surface of the housing 202. The torsion spring 223 is in the natural condition. Meanwhile, the flip 204 is in the opened position and forms an opening angle θ with the housing 202 as shown in FIG. 3A. Besides, the opening angle θ is relative to a distance between the concave portion 246 and the stop portion 247.

When the user turns the opened flip 204 for closing, the flip 204 pivotally rotates relative to the housing 202 along the direction of arrow sign 350 in FIG. 3A to be in a slightly opened position and the opening angle θ decreases. When the flip 204 in the opened position shifts to be in the slightly opened position, the flip 204 carries the bush 222 to rotate and forces the torsion spring 223 to generate a returning force. As shown in FIG. 4B, the protrusion 236 moves along the slope 249 from the concave portion 246 to the convex portion 244 to enable the release button 227 to move toward the bottom of the bush 234 and compress the compression spring 224.

When the flip 204 proceeds to rotate relative to the housing 202 along the direction of the arrow sign 360 in FIG. 3B, the flip 204 in the slightly opened position will shift to be in the closed position, as shown in FIG. 3C. After the protrusion 236 passes the convex portion 244, the compression spring 224 pushes back the camshaft 226 so that the touch joint 229 moves outward the passage 220 and the protrusion 236 moves from the convex portion 244 to the stop portion 247. Due to the coupling between protrusion 236 and the stop portion 247, the flip 204 can be closed relative to the housing 202 stably.

When the user touches the touch joint 229 and pushes the release button 227, the closed flip 204 starts to pivotally rotate relative to the housing 202 along the direction of arrow sign 370 in FIG. 3C. The camshaft 226 moves toward the bottom of the bush 234 to compress the spring 224 while the protrusion 236 moves from the stop portion 247 to the convex portion 244 as shown in FIG. 4B. After the protrusion 236 passes the convex portion 244, the flip 204 rotates by the returning force along the direction of the arrow sign 380 in FIG. 3B until the flip 204 becomes in the opened position, as shown in FIG. 3A. As shown in FIG. 4B, the compression spring 224 pushes back the camshaft 226b so that the touch joint 229 moves outward the passage 220 and the protrusion 236 moves from the convex portion 244 to the concave portion 246. Subsequently, the torsion spring 223 returns to be in the natural condition, as shown in FIG. 4A.

When the user carries heavy stuff with one hand and holds the flip phone 200 with another hand, the design of the hinge mechanism 207 makes the flip phone 200 easy to operate by simply pushing the release button 227 to open the flip 204 for use, which is very convenient.

In addition, the torsion spring and the compression spring can be replaced by other elastic components while the bush is made of wear-resisting materials.

The hinge mechanism according to the preferred embodiment of the invention has the following advantages:

1. Easy assembly and disassembly: the hinge mechanism used for pivoting a flip on a housing prevents the flip and the housing from being damaged during the assembly or disassembly of the flip phone.

2. Easy operation: the design of the torsion spring and the relative motion between a bush and a release button allows for easy operation of the flip. The flip can be opened automatically by a returning force, which is reserved as the flip is in the closed position.

3. It is convenient to operate for users who carries heavy stuff with one hand and holds the flip phone with another hand. It simply requires pushing the release button to open the flip for use with one-handed operation.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hinge mechanism, for pivotally connecting a flip onto a housing so that the flip is rotatable around a pivoting axis, the hinge mechanism comprising:

a bush having a sidewall, a protrusion, and a receiving space defined by the sidewall, the protrusion being protruded from the sidewall;

a release button having a first end, a second end, and a shaped notch, the shaped notch having a concave portion, a stop portion, and a convex portion formed between the concave portion and the stop portion, the stop portion extending substantially parallel to the pivoting axis, the protrusion slidably received within the shaped notch, the first end of the release button slidably coupled to the bush, and the second end of the release button restrictedly coupled to the housing, so that the release button is only slidable relative to the housing substantially along the pivoting axis; and a compression spring disposed within the receiving space and pressed by the release button and the bush;

wherein when the flip pivots from an opened position to a closed position, the bush simultaneously rotates around the pivoting axis so that the protrusion moves from the concave portion to the stop portion;

wherein only when the release button is moved toward the bush till the protrusion moves out of the stop portion and reaches the convex portion, the flip is capable to pivot from the closed position to the opened position.

2. The hinge mechanism according to claim 1, wherein the flip includes a sleeve, one end of which has a bush-receiving space for receiving the bush and the other end of which includes a first joining hole.

3. The hinge mechanism according to claim 2, wherein the sleeve has a first cut and the bush has a second cut for joining the sleeve and the bush so that the bush synchronously rotates with the flip.

4. The hinge mechanism according to claim 2, wherein the housing has a sunken part for receiving the sleeve, the sunken part includes a second joining hole and a passage at opposite sides of the sunken part that the release button passes through the housing via the passage.

5. The hinge mechanism according to claim 4, wherein the hinge mechanism further comprises a torsion spring disposed within the first joining hole and the second joining hole, wherein the torsion spring connects the sleeve and the housing so that the sleeve is rotatably coupled with the housing.

6. The hinge mechanism according to claim 4, wherein the release button comprises:

a camshaft, received in the receiving space, wherein the compression spring connects the camshaft and a bottom of the bush; and a touch joint, being connected with the camshaft and movably installed in the passage for passing through the housing.

7. The hinge mechanism according to claim 1, wherein the release button comprises an axial groove for being connected with the shaped notch so that the protrusion moves from the axial groove to the shaped notch.

8. The hinge mechanism according to claim 6, wherein a first cross-section of the camshaft is round-shaped while second cross-sections of the touch joint and the passage are oval-shaped, and the second cross-section is larger than the first cross-section.

9. The hinge mechanism according to claim 1, wherein the shaped notch further has an axial slot for connecting the stop portion and the convex portion, and a slope for connecting the convex portion and the concave portion.

10. A foldable device, comprising:

a housing;

a flip, pivoting on the housing; and a hinge mechanism, for pivotally connecting the flip onto the housing so that the flip is rotatable around a pivoting axis, the hinge mechanism comprising:

a bush having a sidewall, a protrusion, and a receiving space defined by the sidewall, the protrusion being protruded from the sidewall;

a release button having a first end, a second end, and a shaped notch, the shaped notch having a concave portion, a stop portion, and a convex portion formed between the concave portion and the stop portion, the stop portion extending substantially parallel to the pivoting axis, the protrusion slidably received within the shaped notch, the first end of the release button slidably coupled to the bush, and the second end of the release button restrictedly coupled to the housing, so that the release button is only slidable relative to the housing substantially along the pivoting axis; and a compression spring disposed within the receiving space and pressed by the release button and the bush;

wherein when the flip pivots from an opened position to a closed position, the bush simultaneously rotates around the pivoting axis so that the protrusion moves from the concave portion to the stop portion;

wherein only when the release button is moved toward the bush till the protrusion moves out of the stop portion and reaches the convex portion, the flip is capable to pivot from the closed position to the opened position.

11. The foldable device according to claim 10, wherein the flip includes a sleeve, one end of which has a bush-receiving space for receiving the bush and the other end of which includes a first joining hole.

12. The foldable device according to claim 11, wherein the sleeve has a first cut and the bush has a second cut for joining the sleeve and the bush so that the bush synchronously rotates with the flip.

13. The foldable device according to claim 11, wherein the housing has a sunken part for receiving the sleeve, the sunken part includes a second joining hole and a passage at opposite sides of the sunken part that the release button passes through the housing via the passage.

14. The foldable device according to claim 13, wherein the hinge mechanism further comprises a torsion spring disposed within the first joining hole and the second joining hole, wherein the torsion spring connects the sleeve and the housing so that the sleeve is rotatably coupled with the housing.

15. The foldable device according to claim 13, wherein the release button comprises:

a camshaft, received in the receiving space, wherein the compression spring connects the camshaft and a bottom of the bush; and a touch joint, being connected with the camshaft and movably installed in the passage for passing through the housing.

16. The foldable device according to claim 10, wherein the release button comprises an axial groove for being connected with the shaped notch so that the protrusion moves from the axial groove to the shaped notch.

17. The foldable device according to claim 15, wherein a first cross-section of the camshaft is round-shaped while second cross-sections of the touch joint and the passage are oval-shaped, and the second cross-section is larger than the first cross-section.

18. The foldable device according to claim 10, wherein the shaped notch further has an axial slot for connecting the stop portion and the convex portion, and a slope for connecting the convex portion and the concave portion.

19. The foldable device according to claim 10, wherein the foldable device is a cellular phone.

20. The foldable device according to claim 10, wherein the foldable device is a Personal Digital Assistant (PDA).

* * * * *